United States Patent [19]

Carrington et al.

[11] Patent Number: 4,457,229

[45] Date of Patent: Jul. 3, 1984

[54] SCAN CORRECTION FOR A LINE PRINTER HAVING MULTI-PITCH TYPE CARRIERS

[75] Inventors: James E. Carrington, Vestal; Gerald R. Westcott, Endicott, both of N.Y.

[73] Assignee: International Business Machines Corporation, Armonk, N.Y.

[21] Appl. No.: 453,012

[22] Filed: Dec. 27, 1982

[51] Int. Cl.³ .......................... B41J 1/20; G06F 3/14
[52] U.S. Cl. ................................ 101/93.14; 364/519; 371/47
[58] Field of Search ..................... 101/93, 93.13, 93.14; 364/518, 519; 340/146.3 AH; 371/2, 47

[56] References Cited

U.S. PATENT DOCUMENTS

| | | | |
|---|---|---|---|
| 3,651,487 | 3/1972 | Washington | 364/519 |
| 3,656,426 | 4/1972 | Potter | 101/93.14 |
| 3,691,947 | 9/1972 | Berglund | 101/93.14 |
| 3,697,958 | 10/1972 | Larew | 101/93.14 X |
| 3,699,884 | 10/1972 | Marsh, Jr. et al. | 101/93.14 |
| 3,989,894 | 11/1976 | Charransol et al. | 371/47 |
| 4,007,362 | 2/1977 | Sindermann | 364/518 |
| 4,208,650 | 6/1980 | Horn | 371/47 |
| 4,335,460 | 6/1982 | Bolcavage et al. | 101/93 |
| 4,367,533 | 1/1983 | Wiener | 364/519 |
| 4,386,410 | 5/1983 | Pandya et al. | 364/518 |

OTHER PUBLICATIONS

"Extended Graphics Storage & Serialization for Non-Impact Printers", IBM Tech. Discl. Bulletin, vol. 24, No. 2, Jul. 1981, 1011–1016.

Primary Examiner—E. H. Eickholt
Attorney, Agent, or Firm—John S. Gasper

[57] ABSTRACT

A control system for a band printer uses a correction memory which stores address correction values for resetting the start addresses of the address registers which operate to scan the band image and print line buffers. The correction memory is programmable to store different sets of address correction values when type bands having different size character sets and/or pitch are interchanged.

19 Claims, 12 Drawing Figures

CKB 20

| | 0 | 1 | 2 | 3 | 4 | 5 | 6 | 7 | P |
|---|---|---|---|---|---|---|---|---|---|
| 0 | ENABLE | FIRED | | | | | MISFIRE | | |
| 167 | | | | | | | | | |
| 168 | BIB CORRECT VALUE — SS1 (+1) | | | | | | | | |
| 169 | = | | | — SS2 (+1) | | | | | |
| 170 | = | | | — SS3 (+1) | | | | | |
| 171 | = | | | — SS4 (−2) | | | | | |
| 172 | NEXT PLB START ADDRESS SS1 | | | | | | | | |
| 173 | = | | | | | SS2 | | | |
| 174 | = | | | | | SS3 | | | |
| 175 | = | | | | | SS4 | | | |

.133 PITCH

FIG. 6b

PCB 21

| | 0 | 1 | 2 | 3 | 4 | 5 | 6 | 7 | P |
|---|---|---|---|---|---|---|---|---|---|
| 0 | | | | | | | | SETTLE HAMMER CONTROL | |
| 167 | HAMMER SETTLE CONTROL | | | | | | | | |
| 168 | | | | | | UNDERFLOW OVERFLOW | BIB CORR CYCLE | | |
| --- | | | | | | | | | |
| 171 | | | | | | | | | |

| | 0 | 1 | 2 | 3 | 4 | 5 | 6 | 7 | P |
|---|---|---|---|---|---|---|---|---|---|
| | ENABLE | FIRED | | | | | MISFIRE | | |
| 167 | | | | | | | | | |
| 170 | BIB CORRECT VALUE SS1 (+2) | | | | | | | | |
| 171 | " | | | SS3 (+2) | | | | | |
| 172 | " | | | SS5 (-1) | | | | | |
| 173 | " | | | SS2 (-1) | | | | | |
| 174 | " | | | SS4 (-1) | | | | | |
| 175 | NEXT PLB START ADDRESS SS1 | | | | | | | | |
| 176 | " | | | SS3 | | | | | |
| 177 | " | | | SS5 | | | | | |
| 178 | " | | | SS2 | | | | | |
| 179 | " | | | SS4 | | | | | |

CKB 20

.167 PITCH

FIG. 7a

PCB 21

| | 0 | 1 | 2 | 3 | 4 | 5 | 6 | 7 | P |
|---|---|---|---|---|---|---|---|---|---|
| 0 | | | | | HAMMER SETTLE CONTROL | | | SETTLE HAMMER CONTROL | |
| 167 | | | | | | | | | |
| 170 | | | | | | OVERFLOW | BIB CORR CYCLE | | |
| 174 | | | | | | | | | |

SCAN CORRECTION FOR A LINE PRINTER HAVING MULTI-PITCH TYPE CARRIERS

FIELD OF THE INVENTION

This invention relates to high speed on-the-fly line printers for a data handling system.

BACKGROUND OF THE INVENTION

Line printers of the type in which this invention is useful typically comprise a plurality of print hammers arranged in a row parallel with a continuously moving set of type elements on a continuous type carrier such as a flexible belt band chain or a type train sliding on a guide rail. The print characters contained in the type set customarily are spaced at a pitch which differs from the print hammers so that during the continuous motion the characters are repeatedly alignable in subgroups for impact in accordance with the scan/subscan principle of operation. The print control as represented by U.S. Pat. No. 3,303,776, issued Feb. 14, 1967 to F. Rausch; 3,349,695 issued Oct. 31, 1967 to E. M. Bloom, Jr. et al; 3,629,848 issued Dec. 21, 1971 to R. G. Gibson et al. and 3,899,968 issued Aug. 19, 1975 to B. J. McDevitt have memory devices called the print line buffer or PLB and the band image buffer or BIB (also called the Universal Character Set Buffer). The PLB is loaded with a line of data to be printed. The BIB data is loaded with the type element data arranged to be an electronic image of the characters on the type band. With this control arrangement, it is necessary to only change the code characters stored in the BIB when it is desired to interchange type carriers having different type sets. For printing, the PLB and BIB are scanned, i.e. addressed and read, and the hammers optioned, i.e. addressed, by scan circuitry in synchronism with the type carrier movement in accordance with the alignment sequences of each subscan. The print data and type data read from the PLB and BIB each option time are compared and the optioned hammers fired when there is a match. The scan circuitry includes address means such as counters or registers whose address values are modified each of a plurality of option times of a print subscan. Both address registers must then be corrected to a new start address differing from the last address of the subscan and from the start address of the preceding subscan value at the end of each subscan. Previous printers have used logic circuitry such as address decodes and modifiers to detect the end of each subscan and to perform address correction. Because the respective address means of the PLB and BIB must be corrected differently, the logic circuitry has been complex. The address correction is even more complex when it is desired to interchange type carriers having different character pitch since both the number of subscans and the address sequences of a subscan also change. The present invention accomplishes address correction without the requirement for using address decodes, hardwired address modifiers and other logic circuitry and without the requirement for replacing the logic circuitry when multi-pitch type carriers are interchanged.

SUMMARY OF THE INVENTION

This invention provides a scan control having address correction means for correcting the start address of the PLB and BIB address means by using a programmable address correction storage means which stores control data indicating the end of each subscan and address correction data for resetting the respective address means. The programmable correction storage means preferably is associated with the print data storage device and is addressable by the same address means. The correction storage means preferably stores the control data and address correction data in a manner consistent with the subscan format whereby the address correction values for the BIB address register are read out first and the address correction data for the PLB address register is read out second. The correction storage means further stores control data for indicating whether the BIB address correction value is positive or negative whereby the start address value for each subscan may be corrected in a positive and negative sense.

In accordance with the invention, the BIB address means comprises a dual address register arrangement having a first BIB address register means operable for storing the start address values only. A second BIB address register means is connected to receive the start address values from the first address register means and to a clock controlled address modifier means for storing and applying N modified address values to the BIB where N constitutes a variable number of address values dependent on the number of storage locations addressable in the course of a subscan. The invention further provides means for detecting and adjusting for overflow and underflow BIB address values produced by the BIB address value modification and correction produced by the address modifier and the address correction means. Preferably the overflow and underflow detection means comprises programmable register means for storing predetermined overflow/underflow values related to the size of character set of the individual type.

The invention provides for new control data and address data to be stored in the correction storage device when a type carrier is replaced with one having a different character pitch. New overflow and underflow values are stored in the overflow and underflow register means when a type carrier is replaced with one having a different size character set or pitch.

Thus it can be appreciated that the invention provides a control arrangement which greatly simplifies address correction and provides greater flexibility in a scan control for a high speed printer. The invention further eliminates the need for changing the logic circuitry to achieve the ability to interchange type carriers having different pitches and character sets.

The foregoing and other objects, features and advantages of the invention will be apparent from the following more particular description of a preferred embodiment of the invention, as illustrated in the accompanying drawings.

DESCRIPTION OF THE DRAWING

FIGS. 6a & b are memory maps showing the arrangement for storing address correction and control data for a first type band of FIG. 1.

FIGS. 7a & b are second memory maps for a type band of FIG. 1 having a second character pitch.

DETAILED DESCRIPTION OF THE INVENTION

Figure 1:
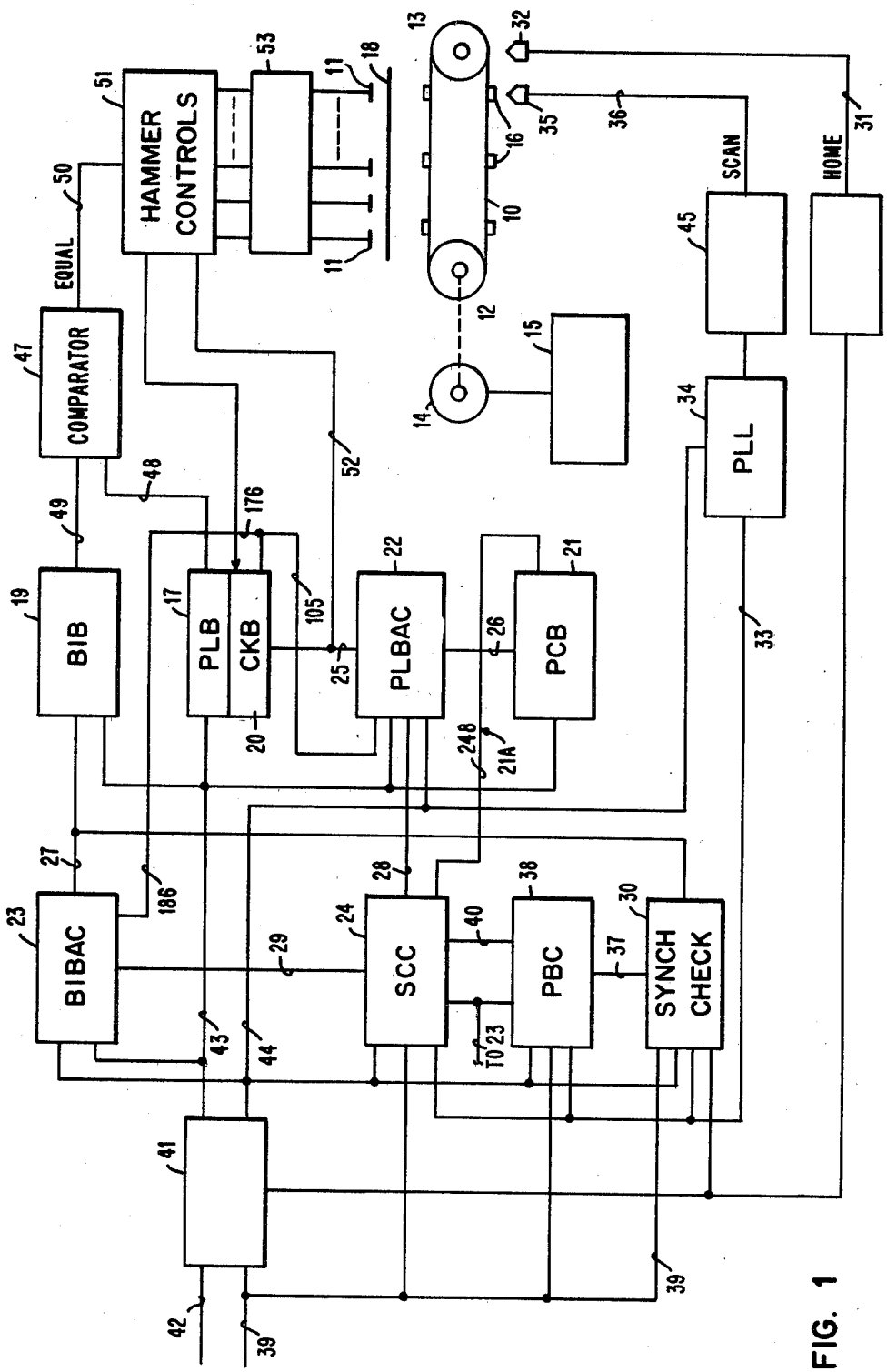
FIG. 1 is a schematic diagram of a printer system which incorporates the invention.

As shown in the schematic diagram of FIG. 1, a printer system for practicing this invention includes a printer mechanism having a continuous flexible metal type band 10 and a row of uniformly spaced electromagnetically operable print hammers 11 arranged in the vicinity of and parallel with a straight portion of type band 10. Type band 10 is supported by rotatable drive pulleys 12 and 13 driven by motor 14 operated at constant speed by motor control 15. Motor 14 may be a DC motor of any well known type and motor control 15 may include a voltage regulator for applying a constant DC voltage to motor 14. Engraved type elements 16, such as characters or other graphic symbols, are spaced uniformly around band 10 at a character pitch which differs from the pitch of hammers 11. Type band 10 is an interchangeable type band where different type bands have different sets or groupings of characters with the same or different pitches for different printing applications. Due to the pitch differential between characters 16 and hammers 11, the characters align as subscan groups with subscan groups of hammers 11 during continuous band motion in accordance with a plurality of continuously recurring scan and subscan sequences. The number of subscans per scan and the alignment sequences depend on the pitch ratio of characters 16 and print hammers 11. The scan/subscan principle of operation is well known and further detailed information may be obtained by reference to U.S. Pat. No. 4,275,653 issued June 30, 1981 to R. D. Bolcavage et al. In a particular arrangement in which this invention is practiced the print mechanism can have one hundred sixty-eight print hammers for one hundred sixty-eight print positions of a print line to be recorded on print medium 18 with the printed characters spaced ten to the inch. Type band 10 may have four hundred eighty individual characters 16 arranged in two identical characters sets of two hundred forty each with the characters spaced 0.133 inches. With this arrangement, a complete revolution of type band 10 would produce 480 scans and 1920 subscans. The subscan alignment sequence for this arrangement is shown in the following table.

From Table I it is readily apparent that every third character 16 of type band 10 aligns with every fourth hammer 11, four subscans comprise a scan, forty-two hammers 11 are optioned each subscan and a character aligns with every hammer in four subscans. It will also be noticed that the alignment sequence for the hammers 11 repeats every four subscans whereas the alignment sequences for characters 16 relative to the same print hammers 11 repeats in proportion with the size of the character set which is every 240 scans.

In a second embodiment in which this invention is illustrated, a second interchangeable type band 10 may have 384 characters in two character sets of 192 each with a spacing of 0.167 inches thereby providing five subscans per print scan. With the arrangement of the second embodiment in which this invention is practiced, a complete revolution of type band 10 would produce 384 scans and 1920 subscans.

The subscan sequence for this arrangement is shown in the following table.

TABLE II

| Scan No. | Subscan No. | Hammer Position No./Character No. | | | |
|---|---|---|---|---|---|
| 1 | 1 | 0/0 | 5/3 | 10/6 | 165/99 |
|   | 2 | 3/2 | 8/5 | 13/8 | 168/101 |
|   | 3 | 1/1 | 6/4 | 11/7 | 166/100 |
|   | 4 | 4/3 | 9/6 | 14/9 | 164/102 |
|   | 5 | 2/2 | 7/5 | 12/8 | 167/101 |
| 2 | 6 | 0/1 | 5/4 | 10/7 | 165/100 |
| * | * | * | * | * | * |
| 91 | 455 | 0/90 | 5/93 | 10/96 | 165/189 |
|   | 456 | 3/92 |   |   | 168/191 |
|   | 457 | 1/91 |   |   | 166/190 |
|   | 458 | 4/93 |   |   | 164/0 |
|   | 459 | 2/92 |   |   | 167/191 |
| 92 | 460 | 0/91 |   |   | 165/190 |
|   | 461 | 3/93 |   | 163/189 | 168/0 |
|   | 462 | 1/92 |   |   | 166/191 |
|   | 463 | 4/94 |   | 159/190 | 164/1 |
|   | 464 | 2/93 |   | 162/189 | 167/0 |
| * | * | * | * | * | * |
| 191 | 955 | 0/190 | 5/1 | 10/4 | 165/97 |
|   | 956 | 3/0 | 8/3 | 13/6 | 168/99 |
|   | 957 | 1/191 | 6/2 | 11/5 | 166/ |
|   | 958 | 4/1 | 9/4 | 14/7 | 164/ |
|   | 959 | 2/0 | 7/3 | 12/6 | 167/ |
| 192 | 960 | 0/191 | 5/2 | 10/5 | 165/ |

From Table II, it is apparent that every third character 16 of type band 10 aligns with every fifth hammer 11, five subscans constitute a scan, thirty-four hammers 11 are optioned in the first, third, and fifth subscans and thirty-three hammers are optioned in the second and fourth subscans. The alignment sequence for hammers

TABLE I

| Scan No. | Subscan No. | Hammer Position No./Character No. | | | | | |
|---|---|---|---|---|---|---|---|
| 1 | 1 | 0/0 | 4/3 | 8/6 |   |   | 164/123 |
|   | 2 | 1/1 | 5/4 | 9/7 |   |   | 165/124 |
|   | 3 | 2/2 | 6/5 | 10/8 |   |   | 166/125 |
|   | 4 | 3/3 | 7/6 | 11/9 |   |   | 167/126 |
| 2 | 5 | 0/1 | 4/4 | 8/7 |   |   | 164/124 |
| * | * | * | * | * | * | * | * |
| 151 | 604 | 0/150 | 4/153 | 8/156 | 116/237 | 120/0 | 164/33 |
|   | 605 | 1/151 | 5/154 | 9/157 | 117/238 | 121/1 | 165/34 |
|   | 606 | 2/152 | 6/155 |   |   |   |   |
| * | * | * | * | * | * | * | * |
| 238 | 952 | 0/237 | 4/0 | 8/3 |   |   | 164/121 |
|   | 953 | 1/238 | 5/1 | 9/4 |   |   | 165/122 |
|   | 954 | 2/239 | 6/2 | 10/5 |   |   | 166/123 |
|   | 955 | 3/0 | 7/3 | 11/6 |   |   | 167/124 |
| 239 | 956 | 0/238 | 4/1 | 8/4 |   |   | 164/122 |
|   | 957 | 1/239 | 5/2 | 9/5 |   |   | 165/123 |
|   | 958 | 2/0 | 6/3 | 10/6 |   |   | 166/124 |
|   | 959 | 3/1 | 7/4 | 11/7 |   |   | 167/125 |
| 240 | 960 | 0/0 | 4/3 | 8/6 |   |   | 164/123 |

11 repeats every five subscans. The alignment sequence for characters 16 repeats every 192 scans.

The print control portion of the schematic diagram of FIG. 1 includes the following elements.

PLB 17—The print line buffer is a random access READ/WRITE electronic memory device. PLB 17 stores binary coded signals representing graphic symbols arranged in the order they are to appear when recorded at each print position in a line of data on print medium 18 by operation of hammers 11. PLB 17 has at least as many storage positions as there are print positions of the print line but may be a standard commercially available memory module for storing 256 bytes of information. In the specific embodiment, binary coded signals of characters to be printed in a print line would be stored in any of storage locations 0-167 of PLB.

BIB 19—the band image buffer is a random access READ/WRITE electronic memory device. BIB 19 stores binary coded signals representing the individual characters 16 arranged in the order in which they appear on type band 10. BIB 19 has at least as many storage positions as there are graphic symbols in a complete set of characters 16 on type band 10. For interchangeable type bands, the number of storage positions in BIB 19 would equal at least the number of individual characters in the largest character set of the group of interchangeable type bands. By way of example, BIB 19 may be a standard size memory module which stores 256 bytes of information where a maximum size character set is 240 characters for a type band having 480 engraved characters. In the specific embodiments previously discussed, coded signals of the individual characters would be stored in storage positions 0-239 of BIB 19 for the four subscan type band and locations 0-191 for the five subscan type band.

CKB 20—the check buffer is a random access READ/WRITE electronic memory device connected to be operated in conjunction with PLB 17. CKB 20 is operated during printing to store hammer check bits written into storage at corresponding hammer addresses for checking various operations of the print hammer control or print hammer mechanisms. In the preferred embodiment of the invention, CKB 20 also stores the address correction data used for correcting the scan circuitry at the end of each subscan when operating in the print mode. For that reason, CKB 20 has a storage capacity exceeding the number of print positions by an amount related to the number of subscans associated with the character pitch of type band 10. As seen in FIG. 6B, CKB 20 has address correction data stored in eight additional storage positions 168-175 for the four subscan, i.e. 0.133 pitch, type band. The address correction data comprises a binary BIB Correction Value arranged in subscan order in storage locations 168-171, and a binary Next PLB Start Address arranged in subscan order in storage locations 172-175. For the same printing mechanism using a five subscan, i.e. 0.167 pitch, type band 10, CKB 20 as seen in FIG. 7B has address correction data stored in ten additional storage positions 170-179. The address correction data comprises a binary BIB Correction Value arranged in subscan order in storage locations 170-174 and a binary Next PLB Start Address arranged in subscan order in storage locations 175-179. Like PLB 17, CKB 20 may be a standard size memory module having a 256 byte storage capacity.

PCB 21—the print control buffer is a random access READ/WRITE electronic memory device connected to be operated in conjunction with PLB 17 and CKB 20. PCB 21 stores control data bytes related to the printing operation as well as the operation of the print hammers such as hammer settling. PCB 21 in accordance with the preferred embodiment of this invention also stores the correction control data used by the scan circuitry at the end of each subscan during the print mode. PCB 21 has a storage capacity which exceeds the number of print positions dependent on the number of subscans associated with the character pitch of the type band 10. As seen in the memory map of FIG. 6A, for a four subscan type band 10 in a print mechanism having 168 print positions, PCB 21 stores correction control bytes in four additional storage locations 168-171. The bit position 6 of the control byte is a one bit used to indicate the end of each subscan. The bit 5 position of the correction control bytes is either a one or zero bit used to indicate whether the related address correction value in CKB 20 is positive or negative for use in checking for an overflow or underflow condition respectively in a manner to be described hereinafter. In FIG. 7A for the same print mechanism, used with a five subscan type band, the memory map shows that PCB 21 stores control bytes in five additional storage locations 170-174 where bit 6 is a one bit used to signal the end of each subscan and bit 5 is a one or zero bit used for detection of overflow/underflow respectively of BIBAC 23. PCB 21 may also be a standard sized memory module having a 256 byte storage capacity.

The scanning circuitry comprises Print Line Buffer Address Circuitry PLBAC 22, Band Image Buffer Address Circuitry BIBAC 23 and the Scan Control and Correction Circuitry SCC 24.

PLB 22AC is connected by bus 25 for addressing PLB 17 and CKB 20 and by bus 26 for addressing PCB 21 and by bus 52 to hammer controls 51 for optioning hammer drivers 53 of hammers 11. PLBAC 22 thereby addresses PLB 17, CKB 20, PCB 21 and hammer controls 51 simultaneously. PLBAC 22 includes the address logic and control circuitry for simultaneously addressing a given storage location of PLB 17, CKB 20 and PCB 21 in load sequence and in subscan sequence.

BIBAC 23 which is connected to BIB 19 by address bus 27 contains all the address logic and control circuitry necessary for addressing all storage positions of BIB 19 in load, subscan or band tracking sequence.

SCC 24 contains the logic circuitry for conditioning the PLBAC 22 and BIBAC 23 as well as other controls for scanning PLB 17 and BIB 19 in subscan sequence. SCC 24 includes logic circuitry operable in response to correction control data signals on line 21A when read from PCB 21 by PLBAC 22 at the end of each subscan and for generating correct cycle control signals on lines 28 and 29 to PLBAC 22 and BIBAC 23 respectively.

Sync check 30 contains the logic circuitry for initiating and periodically checking the synchronization of the scan circuitry with type band 10. Sync check 30 compares for coincidence the addresses on address bus 27 generated by BIBAC 23 to BIB 19 with the known address of a reference character in coincidence with a Home pulse signal on line 31 from transducer 32 at the time it senses a reference mark of the reference character (not shown) on type band 10. Sync check 30 can operate prior to and periodically between printing operations. For example, sync check 30 counts a predetermined number of print subscan PSS pulses on line 33 from phase locked loop PLL 34 between Home pulses on line 31 from transducer 32 and generates a band in sync BIS signal on line 37 to Print Band and Control (PBC) 38 when the count, the BIB address on bus 27 and the Home pulse are coincident. PSS pulses are produced by PLL 34 in response to Scan pulses produced on line 36 to amplifier 45 by transducer 35 sensing timing marks (not shown) on type band 10.

PBC 38—the print band and control contains logic circuitry for generating various control signals used to synchronize BIBAC 23 as well as other operations with the motion of type band 10. Basically PBC 38 includes a subscan ring (not shown) which when activated by a BIS signal on line 37 from sync check 30 generates cyclically repeated successive Start Subscan signals in response to PSS pulses on line 33 from PLL 34.

Interface 41 comprises electronic circuitry and logic adapted for receiving and transferring commands and data transmitted between an external data processing system or device and the print control. Interface 41 transfers binary coded print data and binary coded character data received on bus 42 to PLB 17 and BIB 19 respectively via data bus 43. Interface 41 also transfers address correction data received on bus 42 to CKB 20 and PCB 21 via data bus 43. Data transfer can occur in various ways but preferably occurs serial by byte parallel by bit. Interface 41 sends start address and address modifier data to PLBAC 22 and BIBAC 23 as well as various commands to PLBAC 22, BIBAC 23, SCC and Sync Check 30 via bus 44. In addition to various load commands to be described hereinafter, interface 41 in one embodiment of the invention sends a 0.133 pitch command to PLBAC 22 and BIBAC 23 via bus 44 for selecting various address modifiers thereby altering the scanning sequences associated with the different character pitches of type band 10.

Timing for the printer control operation is provided by an external clock of conventional type which supplies clock pulses on line 39 to interface 41, SCC 24, sync check 30 and PBC 38 and through SCC 24 to PLBAC 22 and BIBAC 23 for timing the scanning of PLB 17 and BIB 19. Timing may also be provided by internal clocks for the PLB 17, BIB 19, CKB 20, PCB 21, which when activated by external commands control the read/write operations conducted internally to these assorted buffers. The internal clocks may be part of an integrated circuit module or package which includes storage cells, read/write drivers, input/output data registers, and conductors necessary for 256 byte memory operation. The scanning operations of PLB 17, BIB 19, CKB 20 and PCB 21 are synchronized by PSS pulses on line 33 generated by phase lock loop PLL 34 in response to Scan pulses on line 36 to amplifier 45 from transducer 35 which is located proximate type band 10 to sense engraved or other timing marks (not shown) on type band 10. The number and timing of the PSS pulses generated by PLL 34 is dependent on and coincides with the character pitch of type band 10. For the four and five subscan type bands (i.e. the 0.133 and 0.167 character pitch) PLL 34 generates four PSS pulses on line 33 in response to each Scan pulse from transducer 35 on line 36.

Comparator 47 comprises logic circuitry connected for comparing coded print data signals on bus 48 when read from PLB 17 by PLBAC 22 with coded character signals received on bus 49 when read from BIB 19 by operation of BIBAC 23. Comparator 47 generates an EQUAL signal on line 50 to hammer fire control 51 when the print data and character signals coincide.

Hammer controls 51 comprises logic circuitry for operating print hammers 11 selected by address signals on bus 52 by PLBAC 22 in response to EQUAL signals on line 50 from comparator 47.

Hammer drivers 53 contain logic and power circuitry for supplying energizing pulses to print hammers 11 selected and enabled by the hammer controls 51.

SCAN CIRCUITRY AND CONTROL

Figure 2:
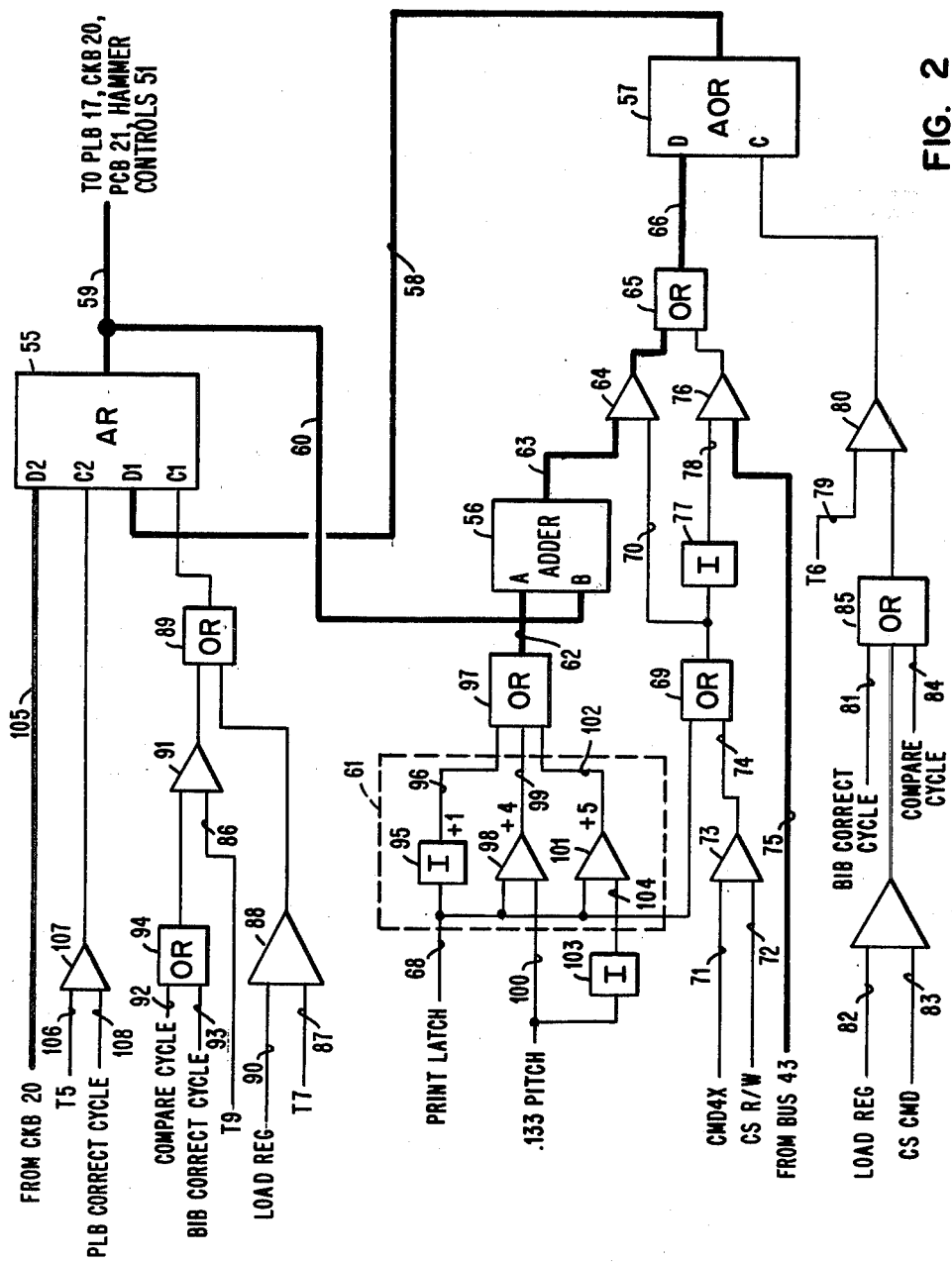
FIG. 2 is a logic diagram showing details of the print line buffer addressing portion of FIG. 1.

As previously mentioned, the scan circuitry and control comprises PLBAC 22, BIBAC 23 and SCC 24. PLBAC 22 in accordance with this invention as shown in FIG. 2 comprises the combination of address register AR 55, binary adder 56 and adder output register AOR 57. AR 55 stores multibit (e.g. eight bit) address values received at a first input D1 on bus 58 connected to the output of AOR 57. The address values stored in AR 55 are applied via output bus 59 to address buses 25, 26 and 52 for addressing PLB 17, CKB 20, PCB 21 and hammer controls 51 (see FIG. 1). Address values stored in AR 55 are also fed back via bus 60 to the B input of adder 56 where they are modified under clock control by adder 56 by summing with one of the several address modifier values preselected by the bit signals supplied by modifier decode circuitry 61 on bus 62 connected from OR circuit 97 to the A input of adder 56. During the print cycle operation the multibit modified address values on bus 63 from adder 56 are gated through AND circuit 64 and OR circuit 65 to the D input of AOR 57 by an up Print Latch signal on line 68 to OR circuit 69 onto line 70. During the loading cycle of operation, modified address values on bus 63 from adder 56 are gated through AND circuit 64 to the D input of AOR 57 by commands CMD4X and CSR/W from interface 41 on lines 71 and 72 respectively to AND circuit 73 connected by line 74 to OR circuit 69. A start address value for loading print data into PLB 17 is provided on bus 75 which corresponds to bus 43 from interface 41. The start address is gated through AND circuit 76 and OR circuit 65 onto bus 66 to the D input of AOR 57 by operation of inverter circuit 77 raising line 78 as a result of the combination of the Print Latch signal on line 68, the CMD4X signal on line 71 and the CS R/W cycle signal on line 72 all being switched down by interface 41. The start address and modified address values are clocked into AOR each clock cycle by T6 clock pulses on line 79 gated through AND circuit 80 to the C input of AOR 57 by either the BIB Correct Cycle signal on line 81 or the Compare Cycle signal on line 82, both from SCC 24 or the CS CMD on line 83 and the Load Reg command on line 84 both from interface 41 all through OR circuit 85.

The start and modified addresses on bus 58 from AOR 57 to AR 55 are clocked into AR 55 each clock cycle at the first input D1 by either T9 clock pulses on line 86 during the printing operation or T7 clock pulses on line 87 during the loading operation. The T7 clock pulses are gated through AND circuit 88 and OR circuit 89 to the C1 terminal of AR 55 by a Load Reg signal on line 90 from interface 41. T9 clock pulses are gated through AND circuit 91 and OR circuit 89 to the C1 terminal of AR 55 by either a Compare Cycle or a BIB Correct Cycle signals from SCC 24 on line 92 and 93 respectively through OR circuit 94.

As previously indicated, address modification is obtained by adder 56 adding one of several selected address modifier values received at its A input from modifier decode circuit 61 on bus 62 to the address received at its B input from AR 55 on bus 60. Modifier decode circuit 61 essentially generates a selected modifier signal which raises various bit lines in bus 62. In the embodiment in which this invention is practiced, modifier decode circuit 61 as seen in FIG. 2 comprises inverter 95 which raises the one bit line of bus 62 by generating a +1 signal on line 96 to OR circuit 97 when selected by a Print Latch signal on line 68 being dropped by interface 41. Thus adder 56 will modify address values on bus 60 from AR 55 in unit increments each clock cycle during loading of PLB 17, CKB 20 and PCB 21. AND circuit 98 raises the bit four line of bus 62 by generating a +4 signal on line 99 through OR circuit 97 when the Print Latch signal on line 68 and the 0.133 Pitch signal on line 100 are both raised by interface 41. Thus during printing adder 56 would modify address values on bus 60 each clock cycle by increments of four whereby PLBAC 22 scans PLB 17, CKB 20 and PCB 21 and the hammer fire control circuitry 51 in accordance with the subscan sequences illustrated in the previously described Table I.

The bit five line of bus 62 connected to the A input of adder 56 is raised by AND circuit 101 generating a +5 signal on line 102 to OR circuit 97 when the Print Latch signal on line 68 is raised and the 0.133 Pitch signal on line 101 is dropped by interface 41 thereby causing inverter 103 to apply an up signal on line 104 to AND circuit 101. In this event, adder 56 would modify address values on bus 60 from AR 55 in increments of five during printing thereby causing PLBAC 22 to scan PLB 17, CKB 20, PCB 21 and hammer fire control 51 in accordance with the previously described sequences of Table II. While a particular modifier decode circuit is described for specific subscan sequences, other modifier means may be used for other sequences. For example, an alternative arrangement would be to substitute a programmable register for modifier decode circuit 61 in which various address modifier values from interface 41 can be stored for application to adder 56 in accordance with various pitches of type band 10.

For PLB address correction to be performed at the end of each subscan, AR 55 has a second input D2 connected by bus 105 for receiving correction address values, i.e. the Next PLB Start address, stored in CKB 20 as previously described. The corrected PLB address values from CKB 20 on bus 105 are clocked into AR 55 for application to output buses 59 and 60 by T5 clock pulses on line 106 gated through AND circuit 107 to the C2 input by a PLB Correct Cycle signal from SCC 24 on line 108.

Figure 3:
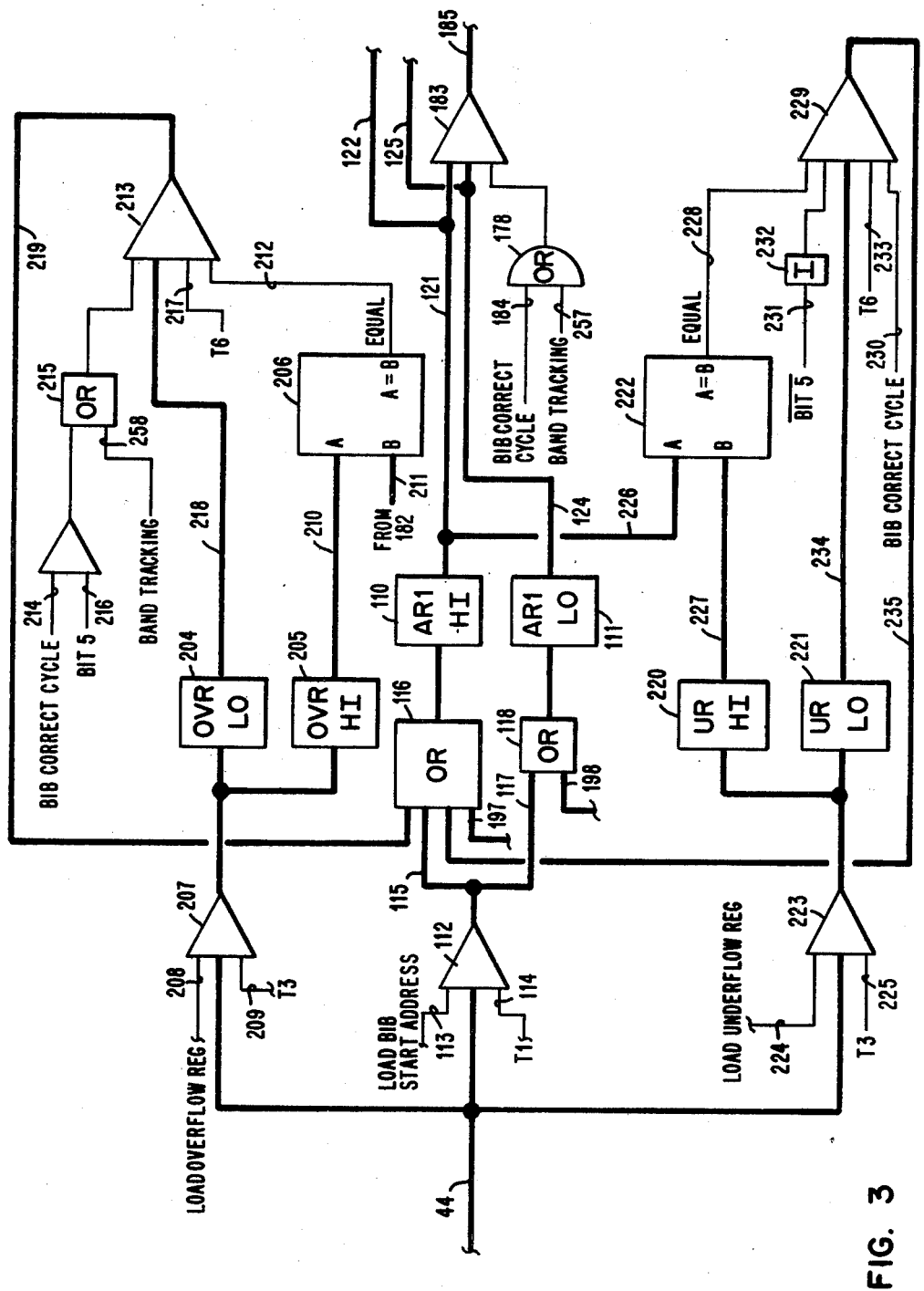
FIGS. 3, 4 & 5 comprise a logic diagram showing details of the band image buffer addressing portion of FIG. 1.
Figure 4:
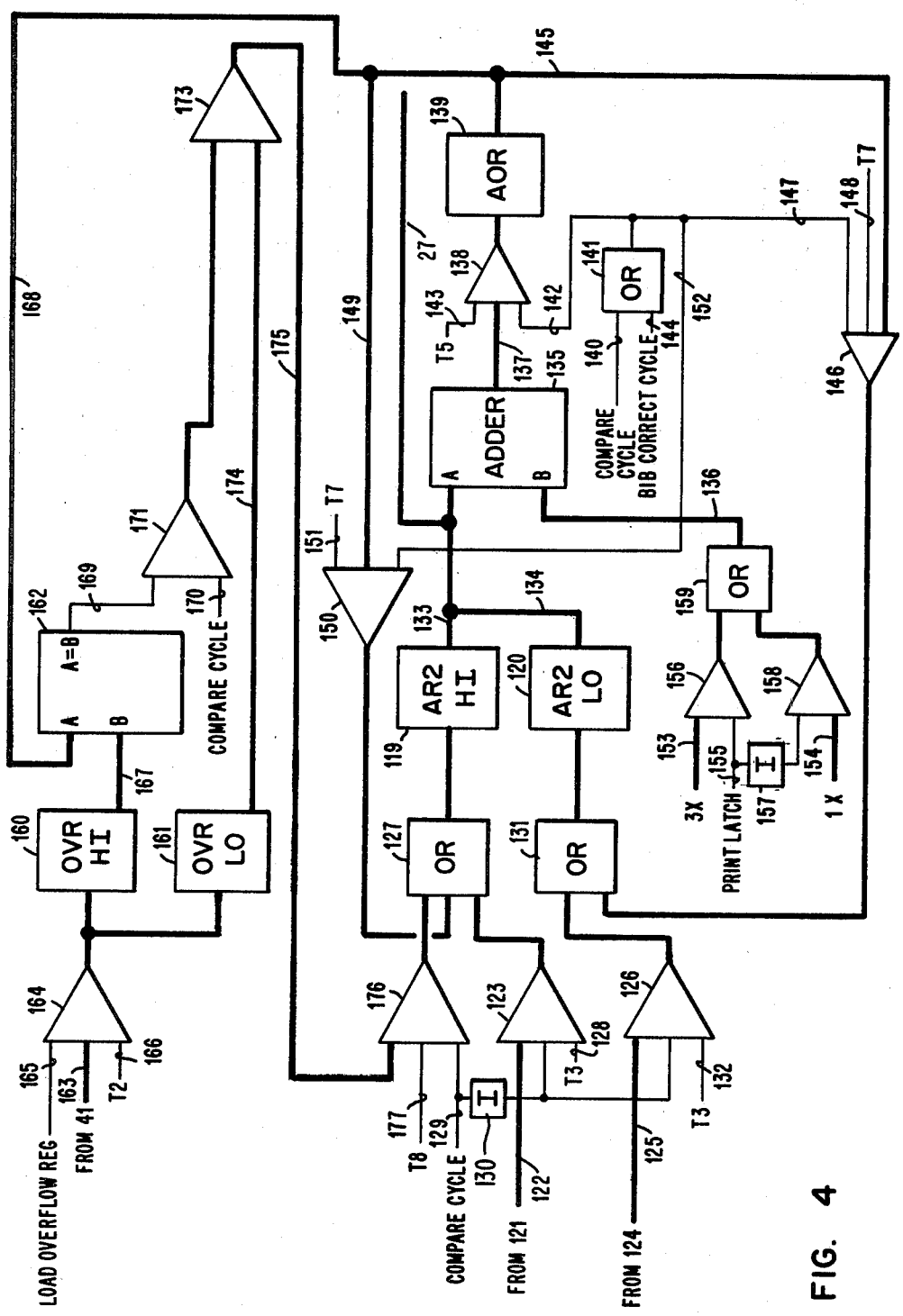

BIBAC 23 as seen in FIG. 3 comprises a first pair of interconnected address registers AR1HI 110 and AR1LO 111. AR1HI 110 is a multibit register which stores the high order bits and AR1LO 111 is a multibit register which stores the low order bits of the BIB start address value for each BIB subscan sequence during the print mode of operation. BIBAC 23 as seen in FIG. 4 also comprises a second pair of address registers AR2HI 119 and AR2LO 120. AR2HI 119 is multibit register which stores the high order bits and AR2LO 120 is a multibit register which stores the low order bits of the start addresses stored in AR1HI 110 and AR1LO 111 respectively as well as modified addresses for scanning BIB 19 during loading and printing operations. Address values in AR1HI 110 are applied on output bus 121 and via connector bus 122 to AND circuit 123 (see FIG. 4). Address values in AR1LO 111 are applied on output bus 124 and via connector bus 125 to AND circuit 126

(see FIG. 4). The high order bits of the start address values on connector bus 122 are gated through AND circuit 123 and OR circuit 127 to AR2HI 119 by a T3 clock pulse on line 128 in combination with a down Compare Cycle signal on line 129 from interface 41 which is raised by inverter 130. The low order bits of the start address from AR1LO 111 on bus 125 are gated through AND circuit 126 and OR circuit 131 to AR2LO 120 by the down Compare Cycle signal on line 129 and at T3 clock signal on line 132. AR2HI 119 and AR2LO 120 are connected by buses 133 and 134 respectively to bus 27 for connection and addressing BIB 19 and to the A input of adder 135 for summing with an address modifier supplied on bus 136 at its B input. Modified address values are applied by adder 135 on output bus 137 and are gated through AND circuit 138 for storage in AOR 139 by the combination of either a Compare Cycle signal from SCC 24 on line 140 through OR circuit 141 onto line 142 and a T5 clock pulse on line 143 or a BIB Correct Cycle pulse on line 144 through OR circuit 141 onto line 142. The low order bits of the modified address in AOR 139 are applied on feedback bus 145 for gating through AND circuit 146 and OR circuit 131 to AR2LO 120 by either a Compare Cycle signal on line 140 or a BIB Correct Cycle signal on line 144 through OR circuit 141 onto line 147 in combination with a T7 clock pulse on line 148. The high order bits stored in AOR 139 are applied on feedback bus 149 for gating through AND circuit 150 and OR circuit 127 to AR2HI 119 by the combination of a T7 clock pulse on line 151 and either the compare cycle signal on line 140 or the BIB Correct Cycle signal on line 144 both through OR circuit 141 to line 152.

Address modifier values for application via bus 136 to the B input of adder 135 are supplied on bus 153 or bus 154 both connected to interface 41. For the type band character pitch embodiments illustrated, an address modifier value 3X for modifying BIB address values by increments of 3 is supplied on bus 153 and gated through AND circuit 156 and OR circuit 159 via bus 136 to the B input of 135 by a Print Latch signal on line 155. A unit increment modifier value 1X on bus 154 is gated through AND circuit 158 and OR circuit 159 onto bus 136 by a down Print Latch signal on line 155 raised by inverter 157.

BIBAC 23 also includes means for detection and correction of an overflow address condition. Overflow addressing occurs when an address modified and generated by adder 135 exceeds the address of the highest used storage location of BIB 19 and the correct address in a subscan sequence should be a lower order value. For example, as seen in Table I, an overflow condition is produced by adder 135 in the address value sequence where in subscan 604 the Character No. sequence progresses from 150 to 33. Again as seen in Table II, the address value sequence generated by adder 135 for subscan 453 results in an address overflow condition which must be detected and corrected. Basically overflow detection is practiced in accordance with this invention by determining when the high order bits of a modified address value produced by adder 135 exceeds a predetermined address value. As seen in FIG. 4, the overflow detection circuitry comprises the combination of a pair of overflow registers OVRHI 160 and OVRLO 161 which store the high and low order bits respectively of a predetermined overflow value and a comparator 162. The overflow value depends on the size of the character set stored in BIB 19. In the specific embodiments the overflow values expressed in hexidecimal code are F0 for the 0.133 pitch type band and C0 for the 0.167 pitch type band. The appropriate overflow values are received on data bus 163 from interface 41 and are gated through AND circuit 164 by a Load Overflow Reg command on line 165 and a T2 clock signal on line 166. The high order bits stored in OVRHI 160 are applied via bus 167 to the B input of comparator 162 for comparison with the high order bits of the addresses stored in AOR 139 and applied on feedback bus 168 to its A input. When the values at the A and B inputs of comparator 162 are equal, comparator 162 generates an overflow signal on line 169 which is gated by a Compare Cycle signal present on line 170 through AND circuit 171 and through AND circuit 173 which in turn gates the low order bits of the overflow address value on bus 174 from OVRLO 161 onto bus 175 to AND circuit 176. The low order bits of the overflow address value are then gated through AND circuit 176 and OR circuit 127 for storage in ARHI 119 by a Compare Cycle signal on 129 and a T8 clock pulse on line 177.

Figure 5:
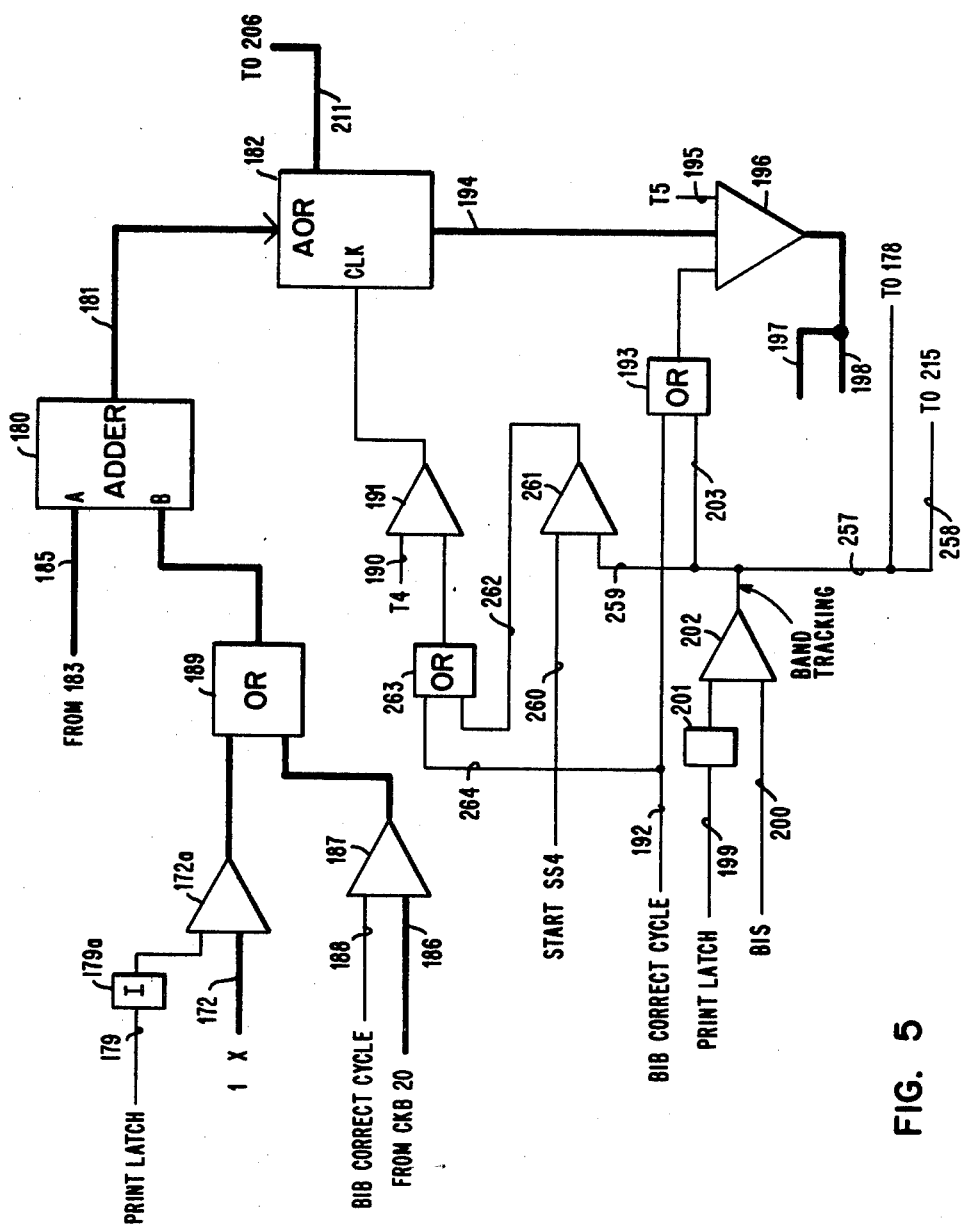

As previously discussed, address correction of BIBAC 23 is performed at the end of each subscan. In the preferred manner in which the invention is practiced, address correction is obtained by modifying the address value of the first pair of address registers AR1HI 110 and AR1LO 111 which during the printing operation stores the start address values for each subscan. Only the second pair of address registers AR2HI 119 and AR2LO 120 is modified during printing to perform the scanning of BIB 19. As seen in FIG. 5, address correction means comprises adder 180 having A and B inputs and an output connected by bus 181 to adder output register AOR 182. For correction start address values, i.e. the start address of each subscan, stored and retained for the subscan interval in AR1HI 110 and AR1LO 111 and applied on bus 121 and 124 respectively are gated through AND circuit 183 (see FIG. 3) by a BIB Correct Cycle signal from SCC 24 on line 184 to OR circuit 178 onto bus 185 to the A input of adder 180. Address correction values read from CKB 20 onto bus 186 by operation of PLBAC 22 are then gated through AND circuit 187 by a BIB Correct Cycle signal from SCC 24 on line 188 and through OR circuit 189 to the B input of adder 180 for summing with the BIB address values at its A input. The corrected address values from adder 180 on bus 181 are clocked into AOR 182 by a T4 clock pulse on line 190 gated through AND circuit 191 by a BIB Correct Cycle signal present on line 192. The high and low order bits of the corrected address value applied on bus 194 from AOR 182 are then gated by the BIB Correct Cycle signal on line 192 through OR circuit 193 along with a T5 clock pulse on line 195 through AND circuit 196 onto feedback buses 197 and 198 and through OR circuits 116 and 118 (see FIG. 3) to the AR1HI 110 and AR1LO 111 for storage until the end of the next subscan.

In the course of performing address correction at the end of each subscan, the corrected address values may be set to address values which exceed the last used address position of BIB 19 and hence are invalid. These conditions occur as a result of the addition by Adder 180 of positive and negative address correction values to the start address of the previous subscan where the start address was at or near the first or last valid address of BIB 19. Thus an overflow or underflow condition would be obtained. The address correction sequence for the 0.133 pitch type bar has, as seen in FIG. 6b, a correction value sequence for successive subscans which is +1, +1, +1, −2. For the 0.167 pitch type band, as shown in FIG. 7b, the correction value sequence is +2, −1, +2, −1, −1. Therefore, for each correction value used to correct the previous start address in AR1HI 110 and AR1LO 111, the corrected address generated by adder 180 at the end of each subscan may produce an overflow or underflow condition in the corrected address value. In accordance with this invention, BIBAC 23 includes means for detecting and adjusting for both overflow and underflow address values stored in AR1HI 110 and AR1LO 111. Referring to FIG. 3, the overflow detection circuitry comprises overflow register OVRLO 204 and overflow register OVRHI 205 and comparator 206. OVRLO 204 and OVRHI 205 are programmed to store low and high order bits respectively of a predetermined overflow address value supplied on data bus 44 by interface 41 and gated through AND circuit 207 by a Load Overflow Reg command on line 208 in combination with a T3 clock pulse on line 209. The specific overflow value for 0.133 pitch type band 10 would be 240. Therefore the hexadecimal F an 0 would be stored in OVRHI 205 and OVRLO 204 respectively. For the 0.167 pitch type band 10 the overflow value would be hexadecimal C0. Comparator 206 compares the high order bits of the overflow address value applied to its A input on bus 210 from OVRHI 205 with the high order bits of a corrected address value applied to its B input on bus 211 from AOR 182 and also stored in ARHI 110. When the values at the A and B inputs of comparator 206 are equal, comparator 206 generates an Equal signal on its output line 212 to AND circuit 213. The combination of the Equal signal on line 212 with a BIB Correct Cycle signal from SCC 24 on line 214 through OR circuit 215, a bit 5 signal from PCB 23 on line 216 and a T6 clock signal on line 217 gates the low order bits in OVRLO 204 and on bus 218 through AND circuit 213 and onto bus 219 through OR circuit 116 for storage in AR1HI 110 and communication on buses 121, 122, 124 and 125 for gating through AND circuits 123 and 126 by a T3 clock pulse on lines 128 and 132 for ultimate storage in AR2HI 119 as the start address value for scanning BIB 19.

The underflow detection and adjusting circuitry comprises underflow register URHI 220 underflow register URLO 221 and comparator 222. URHI 220 and URLO 221 store the high and low order bits respectively of a predetermined underflow address value supplied on data bus 43 from interface 41 when gated through AND circuit 223 by a Load Underflow Reg command on line 224 and a T3 clock pulse on line 225. The underflow address value for both the 0.133 pitch and 0.167 type bands 10 is FF. The hexadecimal value FE would be stored for the 0.133 pitch in URHI 220 and URLO 221. The value FB would be stored for the 0.167 pitch. Comparator 222 compares the high order bits of the corrected address value stored in AR1HI 110 applied to its A input on bus 226 connected to output bus 121 with the high order bits of the underflow address value applied on bus 227 from URHI 220 to its B input. When the values at the A and B inputs are equal, comparator 222 generates an Equal signal on its output line 228 connected to AND circuit 229. The Equal signal on line 228 combined with a BIB Correct Cycle signal on line 230, a down bit 5 signal derived from a zero bit read from PCB 21 and applied on line 231 and raised by inverter 232 and a T6 clock pulse on line 233 gates the low order bits in URLO 221 and on bus 234 through AND circuit 229 onto bus 235 through OR circuit 116 for storage in AR1HI 110 and ultimate communication and storage in AR2HI 119 for the next subscan of BIB 19 as previously described.

Figure 8:
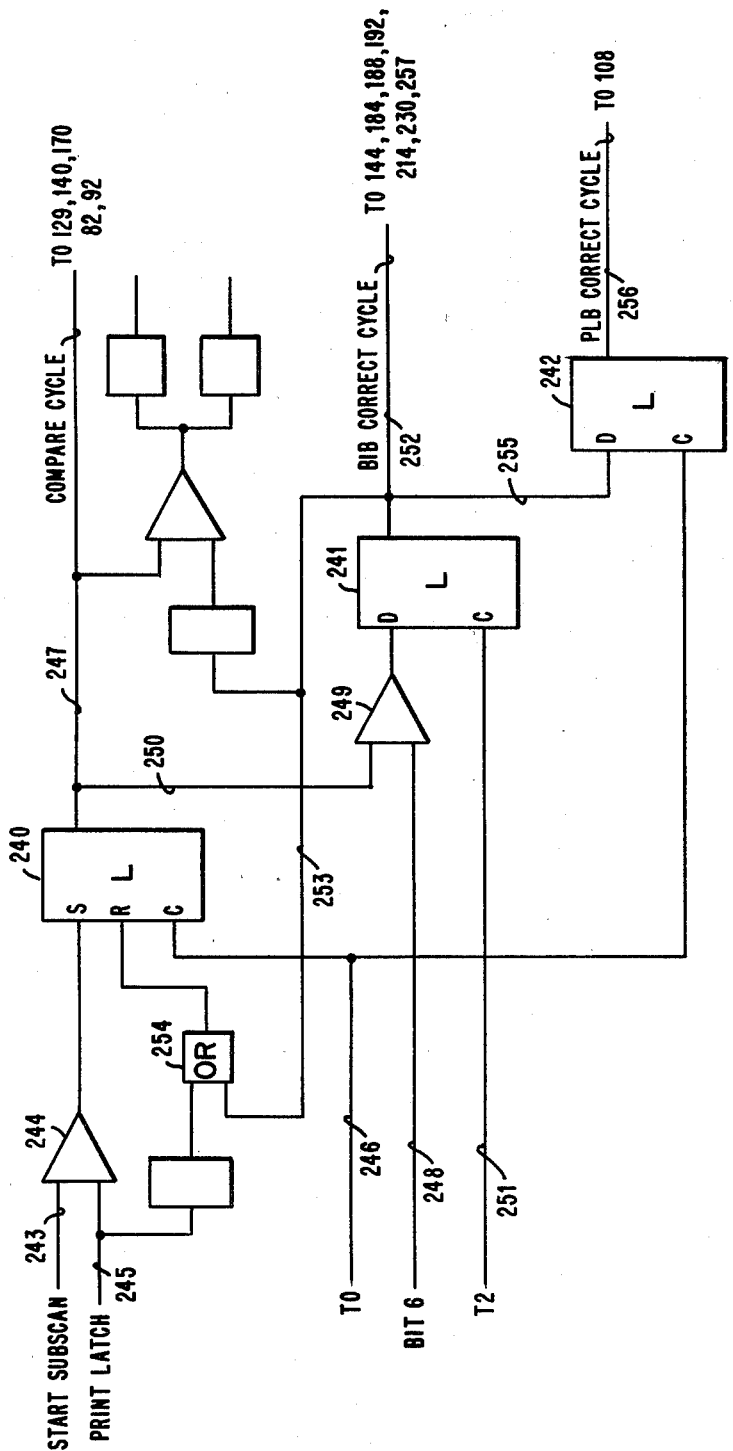
FIG. 8 is a logic diagram showing details of the scan control logic portion of FIG. 1.

SCC 24 as seen in FIG. 8 comprises compare cycle latch 240, BIB correct cycle latch 241 and PLB correct cycle latch 242. Compare cycle latch 240 is activated by the combination of a Start Subscan pulse from PBC 38 on line 243 gated through AND circuit 244 by a Print Latch signal from interface 41 on line 245 to the S input of compare cycle latch 240 and a T0 clock pulse on line 246 connected to the C input of latch 240. When activated, compare cycle latch 240 generates a Compare Cycle signal on line 247 which is connected to various elements of the PLBAC 22 and BIBAC 23 as previously described as well as PLB 17, BIB 19, CKB 20 and PCB 21 thereby activating the scanning and address correction sequences in operating PLB 17, CKB 20, PCB 21 and BIB 19.

BIB correct cycle latch 241 which is a polarity hold latch is activated by a bit 6 signal on line 248 which is gated through AND circuit 249 by the presence of the Compare Cycle signal on line 250 to the D input of BIB correct cycle latch 241 and a T2 clock pulse on line 251 to the C input of BIB correct cycle latch 241. The bit 6 signal is produced by PLBAC 22 reading the correction control byte from PCB 21 in the course of scanning PCB 21 and PLB 17 and CKB 20 thereby signaling the end of the subscan. BIB correct cycle latch 241 when activated generates a BIB Correct Cycle signal on line 252 for connection to PLBAC 22 and BIBAC 23 for operation of those circuits in connection with address correction at the end of the subscan as previously described. The BIB Correct Cycle signal on line 252 is also applied via line 253 through OR circuit 254 to the R input of compare cycle latch 240 thereby resetting compare cycle latch 240 and dropping the Compare Cycle signal on 247. The BIB Correct Cycle signal remains on until BIB correct cycle latch 241 is turned off by the next T2 clock pulse on line 251.

PLB correct cycle latch 242 is a polarity hold latch which is activated by the presence of a BIB Correct Cycle signal on line 252 via line 255 to the D input of PLB Correct Cycle latch 242 in combination with a T0 clock pulse on line 246 to the C input. When activated PLB correct cycle latch 242 generates a PLB Correct Cycle signal on line 256 for connection to line 108 for gating a T5 clock pulse through AND circuit 107 to the C2 input of AR55 (see FIG. 2). The PLB Correct Cycle signal remains on until the next T0 clock pulse on line 246.

DETAILED DESCRIPTION OF OPERATION

Prior to printing lines of data, the control system is operated in a start up procedure by the central data processor through interface 41. Included in the startup procedure are the following.

1. Start band motor 14 and read band ID marks on type band 10.
2. Load the appropriate end of subscan data into PCB 21 and address correction data into CKB 20. This is done by loading PCB 21 and CKB 20 start addresses into AOR 57 (see FIG. 2) of PLBAC 22 via bus 43 from interface 41 (see FIG. 1). A units (1) address modifier value is applied to the A input of adder 56 by a down Print Latch signal from interface 41 on line 68. The start address is thereafter modified each clock cycle to address the PCB 21 and CKB 20 in unit increments to store the correction and end of subscan data into the appropriate storage locations shown in the memory maps of FIGS. 6a, 6b, 7a and 7b.
3. Load character data into BIB 19. A BIB start address value (e.g. 0) is loaded via bus 44 into AR1HI 110 and AR1LO 111 by a load BIB Start Address command on line 113 to AND circuit 112 of BIBAC 23 and clocked through AND circuits 123 and 126 to AR2HI 119 and AR2LO 120 by a down Compare Cycle signal on line 129 and clock pulses on lines 128 and 132. The BIB start address stored in AR2HI 119 and AR2LO 120 is applied via buses 133 and 134 to connector bus 27 directly to BIB 19. The BIB start address stored in AR2HI 119 and AR2LO 120 is modified thereafter each clock cycle by a units '1'X modifier value on bus 154 and gated through AND circuit 158 by a down Print Latch signal from interface 41 on line 155 to the B input of adder 135 which modifies the start address on buses 133 and 134 to the A input of adder 135. The modified addresses are clocked through AND circuit 138 to AOR 139 to the AR2HI and AR2LO registers 119 and 120. Character data is supplied serially and in type band order via interface 41 on bus 43 to BIB 19 for loading at each successive storage position addressed by BIBAC 23 until a complete character set has been stored in BIB 19.
4. Load overflow and underflow address values into BIBAC 23. Overflow and underflow address values are applied by interface 41 through bus 44 and gated through AND circuit 207 by a Load Overflow Reg signal from interface 41 on line 208 and a T3 clock pulse on 209 into ORHI 205 and ORLO 204 registers. Underflow data is loaded from data bus 44 into URHI 220 and URLO 221 by a Load Underflow Reg command on line 225 and a T3 clock pulse on line 224. A second set of overflow data is loaded into OVRHI 160 and OVRLO 161 from bus 163 by a Load Overflow Reg signal from interface 41 on line 165 and a T2 clock pulse on line 166.
5. Load the BIB start address (e.g. 0) for the reference character storage position into ARHI 110 and ARLO 111. This operation by interface 41 precedes the synchronization of the BIBAC 23 with type band 10.
6. Synchronize BIBAC 23 and band tracking. This is done by operation of interface 41 loading a predetermined number proportional to the number of characters in a character set into a counter (not shown) in sync check 30. The counter is activated after band motor 14 is brought up to speed by a first home pulse from transducer 32 on line 31. The counter, when activated, counts PSS pulses from PLL 34 on line 33 until a second home pulse is received. A BIS signal is then generated on line 37 by sync check 30 if the count condition equals the start address otherwise an error condition is indicated for operator attention.

In the band tracking mode, BIBAC 23 beginning with the BIB start address for the reference character storage position in BIB 19 generates a new start address each print scan interval. Band tracking starts with the BIS signal on line 37 activating a subscan ring (not shown) in PBC 38 to generate timed Start Subscan 1-4 sync pulses in response to the PSS pulses from PLL 34 initiated by the Scan pulses from transducer 31. As seen in FIGS. 3 and 5, the BIS signal on line 200 in combination with a down Print Latch signal on line 199 also activates BIBAC 23 by producing a Band Tracking signal on line 257 to AND circuit 183. The Band Tracking signal gates the BIB start address in AR1HI 110 and AR1LO 111 onto bus 185 to adder 180 where the start address is modified by the units increment value 1X on bus 172. The modified address is held on bus 181 until subscan 4 of the print scan. At T4 time of subscan 4 the modified address is clocked into AOR 182 by the combination of a Start SS4 signal on line 260 from PBC 38 to AND circuit 261 with the Band Tracking signal on line 259 and the T4 pulse on line 190 to AND circuit 191. At T4 time the high order bits of the modified address in AOR 182 via bus 211 are checked for overflow by comparator 206.

At T5 time of subscan 4 the modified address on bus 194 is fed back via buses 197 and 198 from AND circuit 196 to AR1HI 110 and AR1LO 111 and onto buses 121 and 124 by the combination of the combination of the band tracking signal on line 203 through OR circuit 193 with a T5 clock pulse on line 195. At T5 time, the band tracking signal being present on line 257, the modified address is immediately gated via AND circuit 183 onto bus 185 to adder 180 where it is again increased by a units increment modifier value and held on bus 181 until the next print scan. At T6 the modified BIB address is corrected if an overflow condition exists. This occurs by the combination of the Band Tracking signal on line 258 through OR circuit 215 to AND circuit 213 along with the T6 clock pulse on line 217. If an Equal signal is present on line 212 from comparator 206 the low order bits of the overflow value on bus 218 from ORLO 204 are gated to and stored in AR1HI 110 replacing the original modified address. The Band Tracking signal being present on line 257 to OR circuit 178 immediately gates the overflow corrected modified address to adder 180 for modification and replacement of the previously modified address being held on bus 181 for the next subscan. The band tracking process continues so long as the BIS signal remains on and the Print Latch signal is down. The band tracking mode is reinitiated when printing is terminated. In this case the band tracking starts with the Print Latch signal only being dropped since the BIS signal remains on. In this instance also, band tracking modification begins with the BIB start address in AR1HI 110 and AR1LO 111 at the time printing was completed. While subscan 4 is used as the time interval for start address modification during band tracking operations, other subscan intervals of the print scan may be chosen but preferably is the last or near the last subscan in the print scan thereby providing a common timing interval for multiple pitch type bands.

Following the startup procedure, the printer control is then operated to begin printing. The initial step in printing is the loading of a line of data by the central processor from bus 42 through interface 41 onto bus 43 to PLB 17. The loading of PLB 17 is first preceded by the loading of PLBAC 22 with a PLB start address supplied by interface 41 on bus 44. The starting address is customarily the first storage position (e.g. position 0) and print data is loaded serially by PLBAC 22 addressing PLB in unit increments. As seen in FIG. 2 the PLB start address is loaded directly into AOR 57 from bus 75. The PLB start address is then clocked into AR 55 for addressing the first storage position of PLB 17 and connection via bus 60 to the B input of adder 56. The PLB start address is modified each clock cycle in unit increments by a +1 signal on line 96 from modifier decode 61 to the A input of adder 56. The address is modified each clock cycle until all desired print data locations of PLB 17 are loaded with the data to be recorded.

Following loading the print cycle begins. The print cycle begins by interface 41 generating a Print Latch signal and PBC 38 generating a Start subscan signal to SCC 24 which activates SCC 24. As previously described SCC 24 generates a Compare Cycle signal on line 247 as previously described which activates PLBAC 22 and BIBAC 23 to scan PLB 17, CKB 20, PCB 21 and BIB 19 in accordance with the alignment sequences in Tables I or II.

Figure 9A:
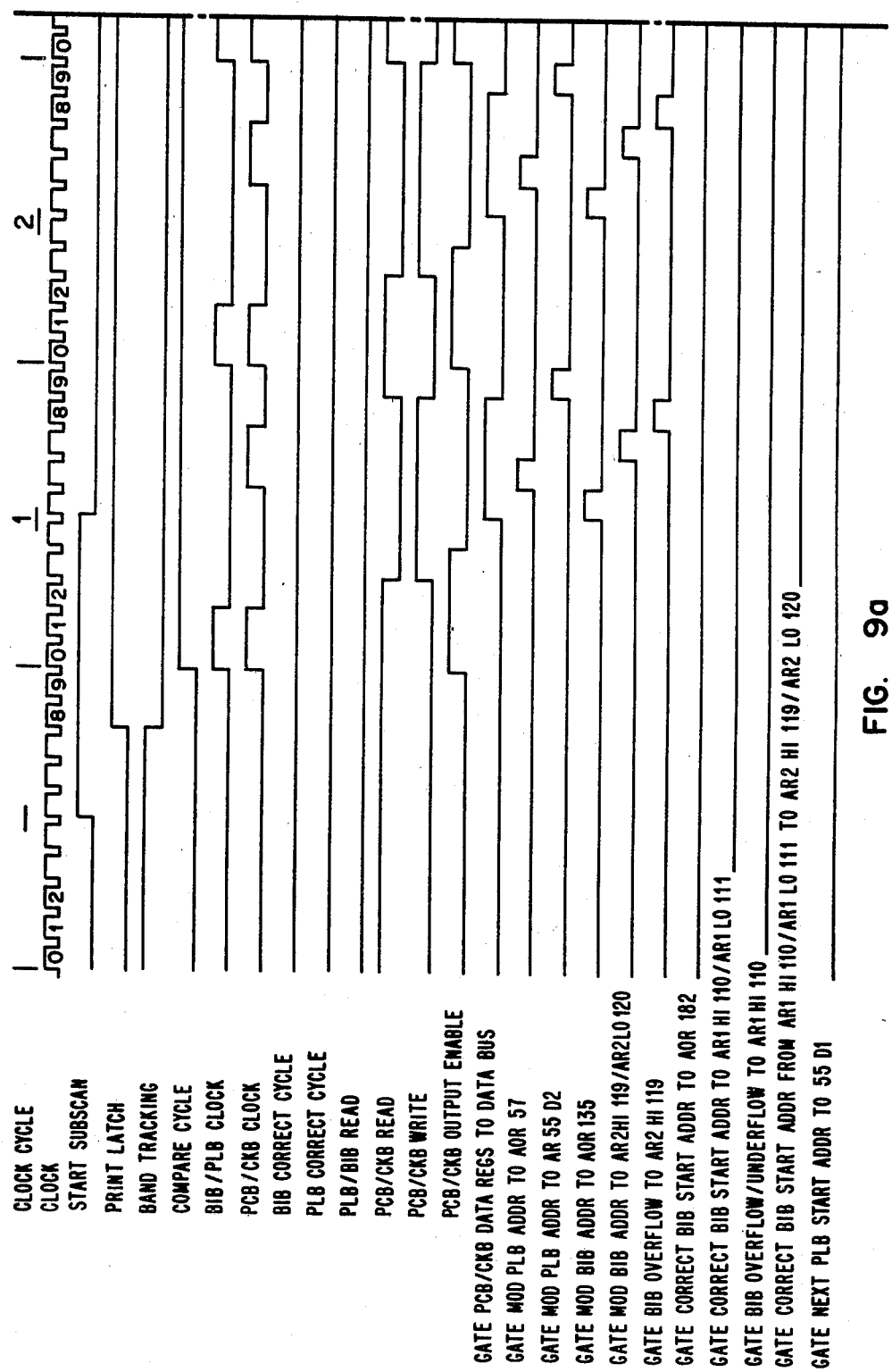
FIGS. 9a & 9b together form a timing chart for illustrating the operation of the invention as described in FIGS. 1-8.
Figure 9B:
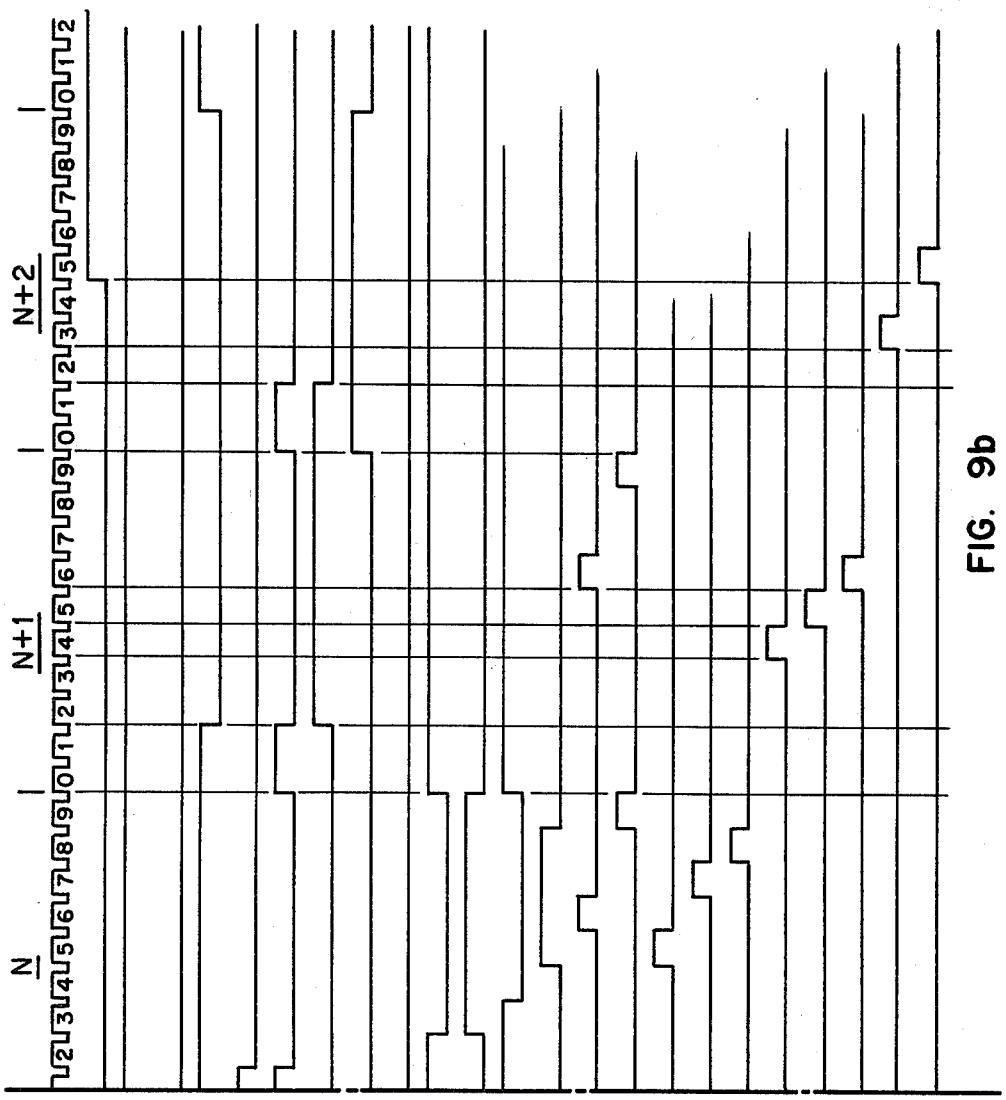

The sequence of operations for a subscan is seen in FIGS. 9a & 9b. As shown in the timing chart there are N clock cycles in which the buffers are scanned followed by two additional clock cycles N +1 and N +2 in which start address correction for PLBAC 22 and BIBAC 23 is performed. The detailed sequence of operation is as follows.

1. In the clock cycle immediately preceding clock cycle 1 (see FIG. 9a) the Start Subscan signal comes on at T5 and remains on for a full clock cycle. Print Latch comes on at T8 and remains on until turned off at the completion of printing. Band Tracking is turned off and remains off until Print Latch is turned off. The subscan start address will have been loaded into AR2HI 119 and AR2LO 120 from AR1HI 110 and AR1LO 111 at T3 time.

2. At T0 of clock cycle 1, Compare Cycle from compare cycle latch 240 of SCC 24 comes on and remains on until reset. Compare Cycle coming on activates the buffer clocks. PLB/BIB Read being on BIB/PLB Clock comes on from T0 to T2 for reading memory locations of PLB 17 and BIB 19 addressed by PLBAC 22 and BIBAC 23 to comparator 47. The PCB/CKB Clock operates to generate read and write pulses each clock cycle which in combination with PCB/CKB Read PCB/CKB Write PCB/CKB Output Enable and Gate PCB/CKB Data Regs To Data Bus perform the reading and writing operations at common memory locations addressed by PLBAC 22.

PLB/BIB Read being on character data is read from BIB 19 by BIBAC 23 at the subscan start address set in AR1HI 110 and AR1LO 111 of BIBAC 23 at T3 of the SS4 during band tracking, compared with print data read from PLB 17 by PLBAC 22 at the preset start address position in AR55 of PLBAC 22, and a decision made by comparator 47 if coincidence is present thereby activating the hammer fire control 51. At corresponding storage positions addressed by PLBAC 22, PCB 21 and CKB 20 are cycled through a read/write operation by PCB/CKB Read, PCB/CKB Write, PCB/CKB Enable, and Gate PCB/CKB Data Regs To Data Bus. At T5 the BIB address is incremented three positions by adder 139, stored in AR2HI 119 and AR2LO 120 at T7, checked by comparator 162 and corrected at T8 if overflow is found. The PLB address is incremented either by an increment of 4 or 5 by adder 56 dependent on whether the 0.133 signal is present on line 100 to decode 61, gated into AOR 57 at T6, and stored in AR55 at T8.

3. The process is repeated in clock cycle 2 and in every clock cycle thereafter until clock cycle N. In clock cycle N, the last storage memory location corresponding to any of the Last Hammer No./Character No. positions shown in Tables I or II in the subscan is addressed, read out and compared. Again the address in AR55 of PLBAC 22 is modified the selected amount by adder 56, gated into AOR 57 at T6, and stored in AR55 at T8.

4. At T0 of clock cycle N +1, PCB/CKB Clock PCB/CKB Read, and PCB/CKB Enable coming on, address correction data is read from PCB 21 (see FIG. 6a, 6b or FIGS. 7a, 7b) a bit 5 signal, positive or negative, is applied to the overflow circuitry of BIBAC 23 as previously described and a bit 6 signal is applied to SCC 24. A BIB Correct Value for positive or negative modification of the original start address is read from the corresponding storage position of CKB 20 (see FIGS. 6a, 6b, 7a, 7b) and applied to bus 186 of BIBAC 23. BIB Correct Cycle from BIB correct cycle latch 241 of SCC 24 coming on at T2 gates both the BIB start subscan address to input A and the BIB Correct Value from CKB 20 to input B of adder 180. The corrected BIB start address from adder 182 is clocked into AOR 180 at T4 and checked for overflow by comparator 206 stored in AR1HI 110 and AR1LO 111 at T5 and checked for underflow by comparator 222 and corrected for any detected overflow/underflow at T6. The PCB/CKB address having been modified (by either an increment of 4 or 5) by adder 56 is clocked into AOR 57 at T6 and clocked into D1 of AR55 at T9 thereby addressing the last subscan storage position of CKB 20 (see FIGS. 6b, 7b).

5. At T0 of clock cycle N +2, with PCB/CKB Read and PCB/CKB Enable being on and PCB/CKB Clock coming on, the Next PLB Start Address (see FIGS. 6b, 7b) of CKB 20 is read out from the storage location addressed by AR55 and applied via bus 105 to D2 of AR55 of PLBAC 22. At T0, PLB Correct Cycle from PLB correct cycle latch 242 of SCC 24 comes on and at T2 the polarity hold BIB correct cycle latch 241 of SCC 24 times out and BIB Correct Cycle goes off. With both Compare Cycle and BIB Correct Cycle off, modified addresses on bus 58 from AOR 57 of PLBAC 22 will be blocked from entry into AR55 for the remainder of the clock cycle.

At T3 the subscan start address in AR1HI 110 and AR1LO 111 is gated into AR2HI 119 and AR2LO 120 thereby addressing BIB 19 at the start address for beginning of the next subscan. At T5 the next subscan PLB address is gated into AR55 thereby addressing PLB 17 at the storage position for the beginning of the next subscan.

PLB correct cycle latch 242 having timed out PLB Correct Cycle goes off at T0. With Start Subscan having been turned on by PBC 38 at the preceding T5, the Compare Cycle from compare cycle latch 240 of SCC 24 again comes on thereby starting the scanning sequence for the second subscan at the next sequence of addresses for PLB 17 BIB 19 PCB 21 and CKB addresses. Thus address correction at the end of each subscan is self-correcting as part of a normal scan operation and can be readily programmed for interchanging type bands having different character sets or different pitches.

While the invention has been particularly shown and described with reference to preferred embodiments thereof, it will be understood by those skilled in the art that the foregoing and other changes in form and details may be made therein without departing from the spirit and scope of the invention.

We claim:

1. A control system for a line printer with an endless type carrier having uniformly spaced type characters continuously movable relative to a plurality of uniformly spaced print positions of a print line, said type characters and said print positions having a relative spacing whereby said characters are alignable with said print positions in a plurality of subscan sequences, a character storage device for storing character data in the order said type characters are arranged on said type carrier, a data storage device for storing print data in the order characters are to be printed at said print positions of said print line, means for supplying subscan pulses in response to the motion of said type characters relative to said print positions, address means connected to said data and character storage devices, said address means being operable for addressing said data and said character storage devices in subscan sequence dependent on said relative spacing of said type characters and said print positions, scan control means responsive to said subscan pulses for activating said address means at the beginning of each subscan and to control said addressing of said data and character storage devices in subscan sequence, and address correction means including correction memory means connected for addressing by said addressing means and containing correction control data and address correction data, said correction memory means being further connected to said address means by correction control circuitry responsive to said correction control data to control the addressing of said correction memory means and to reset said address means at the end of each subscan in accordance with said address correction data in said correction memory means.

2. A control system in accordance with claim 1 in which said address means comprises first address means connected to said character storage device, second address means connected to said data storage device, said first and second address means being operable in first and second subscan sequences respectively, said correction memory means is connected for addressing by said second address means in accordance with said second subscan sequence, said correction memory means contains first address correction data for resetting said first address means and second address correction data for resetting said second address means, and said correction control circuit means is operable to control the addressing of said correction memory means by said second address means and to sequentially reset said first and second address means at the end of each subscan in accordance with said first and second address correction data contained in said correction memory means.

3. A control system in accordance with claim 2 in which said correction control circuit means comprises
   a first correction control element responsive to said correction control data in said correction memory means to generate a first correct signal to control the addressing of said correction memory means by said second address means and to reset said first address means, and
   a second correction control element responsive to said first correct signal to generate a second correct signal to further control the addressing of said correction memory means by said second address means and to reset said second address means.

4. A control system in accordance with claim 2 in which
   said first correction control data comprises a set of address correct values for resetting said first address means,
   said second correction control data comprises a set of start address values for resetting said second address means,
   said set of address correct values and said set of start addresses are arranged in said correction memory means for addressing in subscan sequence by said second address means, and
   said correction control data includes an end of subscan control bit arranged in said correction memory means for addressing with said set of address correct values by said second address means.

5. A control system in accordance with claim 4 in which
   said address correct values include positive and negative correct values for resetting said first address means.

6. A control system in accordance with claim 4 in which
   said correction control circuit means includes a first correction element operable in response to said end of subscan control bit to reset said first address means in accordance with said address correct values in said correction memory means, and
   a second correction control element responsive to the operation of said first correction control element to reset said second address means in accordance with said start address values in said correction memory means.

7. A control system in accordance with claim 6 in which
   said address means further comprises a start address register for storing a start address for said character storage device, and
   said first correction control element is operable in response to said end of subscan control bit to correct said start address in accordance with said address correct values in said correction memory means.

8. A control system in accordance with claim 4 in which
   said correction control circuit means includes a first correction control element operable in response to said end of subscan control bit for producing an end of subscan signal, and
   means responsive to said end of subscan signal for correcting said start address in said start address register in accordance with said address correct values in said correction memory means.

9. A control system in accordance with claim 8 in which said address correct values include both positive and negative address correct values, and
   said means for correcting said start address is operable for increasing or decreasing said start address in said start address register depending on whether said address correct values are positive or negative.

10. A control system in accordance with claim 9 in which
    said first address means further includes checking means for determining whether the corrected start address is an invalid address relative to predetermined boundary addresses for said character storage device, and
    means for further correcting the corrected start address in the event said checking indicates an invalid corrected start address.

11. A control system in accordance with claim 10 in which
    said correction control data in said correction memory means includes a sign control bit for indicating whether said address correct values in said correction memory means are positive or negative, and
    said checking means is operable in response to said sign bit for determining whether the corrected start address is an invalid overflow or underflow address relative to said boundary addresses of said character storage device.

12. A control system in accordance with claim 11 in which
    said means for correcting an invalid corrected start address comprises means for storing an overflow boundary address,
    means for comparing the high order bits of the corrected start address in said start register with the high order bits of said overflow boundary address, and
    means response to a positive sign bit in said correction memory device for correcting said high order bits of said corrected start address with the low order bits of said overflow address.

13. A control system in accordance with claim 11 in which
    said means for correcting an invalid corrected start address comprises means for storing an underflow boundary address,
    means for comparing the high order bits of the corrected start address with the high order bits of said underflow boundary address, and
    means responsive to a negative sign bit in said correction memory means for correcting said high order bits of said corrected start address with said low order bits of said underflow boundary address.

14. A control system in accordance with claim 8 in which
    said first address means include a subscan address register connected for addressing said character storage device,
    said subscan register being further connected to said start address register,
    means for conditioning said subscan address register with addresses stored in said start register for the beginning of each subscan,
    means for periodically increasing the subscan address stored in said subscan address register by a fixed amount dependent on said relative spacing of said type characters and said print positions,
    checking means for determining whether each increased address is an invalid address which overflows a predetermined boundary address of said character storage device, means for correcting said increased address in the event said checking means indicates an invalid overflow address.

15. A control system in accordance with claim 14 in which said checking means includes means for storing a predetermined overflow boundary address, means for comparing the high order bits of each increased address with the high order bits of said overflow address and generating an overflow signal in the event they are equal, and means responsive to said overflow signal from said comparing means for correcting said high order bits of said increased address with the low order bits of said overflow address.

16. A control system in accordance with claim 15 in which said type carrier is interchangeable with a plurality of type carriers having different size character sets, said character storage device has predetermined boundary addresses dependent on the size of said character set of said type carrier, and said means for storing said underflow address value is a programmable storage means for storing different overflow addresses dependent on the size of the character set of said type carrier.

17. A control system in accordance with claim 9 in which said correct address values are stored in said correction memory means for addressing in subscan order in accordance with the sequence $+1, +1, +1, -2$.

18. A control system in accordance with claim 9 in which said correct address values are stored in said correction memory means for addressing in subscan order in accordance with the sequence $+2, -1, +2, -1, -1$.

19. A control system for high speed printer having a revolving type carrier for moving a continuous array of type elements past a row of impression devices at a print line comprising a character storage device for storing an image of said array of type elements, a data storage device for storing a line of data to be printed, means for scanning said character and data storage devices including address register means for reading out type element data from character storage device and print data from said data storage device in a plurality of subscans, scan control means for correcting the address values of said address address register means to a new start address at the end of each subscan comprising correction storage means associated with said data storage device containing control data for indicating the end of each subscan and address correction data for modifying address data in said address registers at the end of said subscans, and means controlled by said scan control means for transferring said address correction data from said correction storage means to said address register means at the end of each subscan in response to said control data in said correction storage means.

* * * * *